Patented Aug. 7, 1951

2,562,955

UNITED STATES PATENT OFFICE 2,562,955

SILICON CONTAINING DERIVATIVES OF CELLULOSIC MATERIAL

Hartwig A. Schuyten, Jeremiah W. Weaver, and John David Reid, New Orleans, La., assignors to the United States of America as represented by the Secretary of Agriculture No Drawing. Application May 7, 1948, Serial No. 25,774

9 Claims. (Cl. 260—212)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to silicon containing derivatives of cellulosic materials. The initial cellulosic material may be cellulose itself as derived from cotton or from wood pulps, preferably chemical wood pulps, such as sulphite pulp, soda pulp, and sulphate pulp from which the lignin, pentosan, resin and like constituents have been removed, near conversion products of cellulose, for example, the regenerated cellulosic type of viscose, and organic ethers or esters of cellulose having free hydroxyl groups, like the incompletely substituted alkyl (particularly methyl and ethyl), aralkyl, hydroxyl alkyl and carboxy alkyl esters or ethers of cellulose.

The invention has among its objects the production of silicon containing derivatives of the cellulosic material which are homogeneous, and which contain a high silicon content, and a process by which the degree of silicon content may be controlled.

In general, according to the invention, the cellulosic material is treated with a liquid silylating agent in the presence of an acid-binding agent (a tertiary heterocyclic amine) under anhydrous conditions.

Alkyl-silicon compounds like the alkyl-silicon chlorides, trimethylchlorosilane, triethylchlorosilane, dimethyldichlorosilane, and methyltrichlorosilane, or others like the alkyl-silicon acetates, trimethylacetoxysilane and dimethyldiacetoxysilane, are examples of suitable silylating agents. In general, these agents may be described by the formula $SiR_4$, where at least one of the R's, but not more than three, is an active acid radical, Cl or acetoxy, and the other R's are alkyl.

Suitable acid-binding agents include pyridine, quinoline, isoquinoline, and so forth.

The reaction will take place at low temperature, although it is efficient and preferred to conduct it at reflux temperatures.

The amount of alkyl-silyl group substitution may be controlled by varying the amount of silylating agent used in the reaction, the larger amount of silylating agent resulting in the higher substitution. By varying the conditions, the average alkyl-silyl group substitution may be varied from less than one alkyl-silyl group per glucose unit, calculated on the $C_6$ glucose unit formula for the cellulose, to substantially complete substitution (three alkyl-silyl groups per glucose unit), as shown by gains in weight as high as 119 percent and silicon content as high as 20 percent.

If the cellulosic material used is already partially substituted with organic groups, the remaining free hydroxyl groups may be substituted partially or substantially completely with alkyl-silyl groups to form mixed organic, alkyl-silyl esters of ethers of cellulose. Also, if cellulose itself is first silylated to give partial substitution of the alkyl-silyl groups, the resulting product may be further esterified or etherified with the desired organic groups in the usual manner to give the resulting mixed derivative. The organic groups substituted may be mixed as well as the alkyl-silyl groups.

The highly silicon-substituted derivatives of cellulose thus obtained are insoluble in cuprammonium solution, and other common solvents for the usual cellulosic esters or ethers, and the mixed organic, alkyl-silyl derivatives are insoluble in any of the solvents or solvent mixtures normally employed for dissolving the usual organic cellulose esters or ethers to a degree depending on the degree of silicon content.

For a detailed description of the invention, reference is made to the following examples in which the alkyl-silyl group substitution is computed for the average substitution per glucose unit.

EXAMPLE I

Anhydrous cotton linters was treated with trimethylchlorosilane in various amounts in pyridine at reflux temperature to give trimethylsilyl-celluloses in which the amount of trimethylsilyl group substitution depends on the molar ratios of the silane and cellulose. The table illustrates a series of such experiments.

*Table*

| Exp. No. | Wt. Sample | Wt. Silane | Mole Ratio Silane to Cellulose | Wt. Gain | Trimethyl-silyl Groups Substituted Calculated by Weight Gain | Per Cent Si Found |
|---|---|---|---|---|---|---|
| 1 | 2.025 | 0.693 | 0.511 | 0.120 | 0.13 | 0.40 |
| 2 | 1.967 | 2.330 | 1.77 | 0.668 | 0.78 | 6.04 |
| 3 | 2.008 | 2.743 | 2.04 | 0.852 | 0.95 | 9.87 |
| 4 | 2.017 | 3.387 | 2.51 | 1.000 | 1.12 | 10.61 |
| 5 | 2.050 | 5.136 | 3.74 | 1.540 | 1.69 | 14.92 |
| 6 | 2.000 | 5.370 | 4.01 | 1.925 | 2.17 | 16.13 |
| 7 | 1.987 | 6.680 | 5.02 | 2.193 | 2.48 | 18.72 |
| 8 | 2.028 | 7.482 | 5.51 | 2.331 | 2.58 | 19.60 |
| 9 | 2.082 | 7.781 | 5.58 | 2.379 | 2.57 | -------- |
| 10 | 2.025 | 7.581 | 5.59 | 2.385 | 2.65 | -------- |
| 11 | 2.105 | 9.940 | 7.05 | 2.514 | 2.69 | 20.40 |
| 12 | 2.040 | 10.475 | 7.67 | 2.420 | 2.66 | 19.50 |
| 13 | 2.002 | 11.254 | 8.39 | 2.081 | 2.34 | 18.51 |

EXAMPLE II

Five parts of anhydrous cotton cellulose was placed in a flask equipped with a stirrer and reflux condenser. Twenty parts of trimethylchlorosilane in 200 parts of anhydrous pyridine was added and the mixture heated to boiling. Heating and stirring was continued for 3 hours, after which time the mixture was cooled, filtered, washed with anhydrous pyridine, and dried. The cellulose showed an increase in weight of 6.07 parts, which corresponds to a substitution of 2.73 trimethylsilyl groups. Analysis showed a Si content of 20.15%.

EXAMPLE III

Twenty-eight parts of cellulose acetate containing 2.87 acetyl groups per glucose unit was treated as in Example II with 53 parts of trimethylchlorosilane. The resulting trimethylsilylcellulose acetate was soluble in pyridine and was precipitated by pouring into water. The product showed a gain in weight of 1.2 parts and a silicon content of 1.03% corresponding to a trimethylsilyl group substitution of 0.14. The acetyl content was unchanged, giving a total calculated substitution of 3.01 groups.

EXAMPLE IV

Nineteen parts of cotton cellulose was treated as in Example II with 102 parts of methyltriacetoxysilane. The product showed a gain in weight of 0.8 part and had a calculated silicon content of 1.16%.

EXAMPLE V

Twenty parts of cotton cellulose was treated as in Example II with 120 parts of octyltrichlorosilane. The resulting octylsilylcellulose showed a gain in weight of 0.3 part and had a calculated silicon content of 1.33%.

EXAMPLE VI

Twenty parts of methylcellulose containing 1.8 methyl groups per glucose unit was treated as in Example II with 90 parts of trimethylchlorosilane. The resulting methyl, trimethylsilylcellulose showed a silicon content of 3.56% corresponding to a trimethylsilyl group substitution of 0.24. The methoxyl content was unchanged, giving a total substitution of 2.04 groups.

EXAMPLE VII

Twenty-two parts of cotton cellulose was treated as in Example II was 75 parts of trimethylsilicon acetate. The resulting trimethylsilylcellulose showed a gain in weight of 0.55 part corresponding to a group substitution of 0.06.

It is to be understood that the foregoing examples are representative merely of a few of the many modifications to which this invention may be subjected. They may be varied widely with respect to individual reactants and the amounts thereof, and the conditions of reaction without departing from the scope of this invention.

Cellulosic materials treated in the above-mentioned manner become quite hydrophobic in nature. This is probably due not merely to blocking of the hydroxyl groups, as in cellulose acetate, because the effect far transcends that, but to the hydrophobic nature of the alkyl silyl group. The fact that the group is a part of the molecule aids greatly in giving permanence to useful properties of the product as opposed to the effect obtained when an easily removable adsorbed polymer is present.

Insolubilization of cellulose and of cellulose derivatives is easily obtained, in those cases where this property is desirable, by changing the amount of silyl group present. For example, cellulose acetate containing approximately two acetyl groups per glucose residue, is soluble when approximately one tri-substituted silyl group is present but insolubility is obtained when the proportion of the latter increases with respect to the former. Insolubility is also quickly obtained when difunctional silyl materials are used. For example, only a small amount of dimethyldichlorosilane need be used with cellulose acetate to obtain insolubility. This is probably due to cross linkage between different cellulosic residues.

Cellulose derivatives which are contemplated for use in this connection are cellulose esters, such as cellulose acetate, and cellulose ethers, such as methyl cellulose, which might be used in making of sheets, film, yarns, and fibrous materials where increased hydrophobic properties and insolubility in organic solvents are desirable properties.

Having thus described the invention, what is claimed is:

1. A process comprising reacting a cellulosic material with a liquid silylating agent in the presence of a tertiary heterocyclic amine under anhydrous conditions at reflux temperature, said silylating agent having the formula $SiR_4$, where at least one of the R's, but not more than three, is of the class consisting of Cl and acetoxy, and the other R's are alkyl, to produce a homogeneous, silicon containing derivative of the cellulosic material having an average alkyl-silyl group substitution of from 0.13 to 3.0 groups per glucose unit calculated on the $C_6$ glucose unit formulae for cellulose.

2. The process of claim 1, wherein the cellulosic material is cellulose.

3. The process of claim 1, wherein the cellulosic material is methyl cellulose.

4. The process of claim 1, wherein the cellulosic material is cellulose acetate.

5. The process of claim 1, wherein the silylating agent is an alkyl-silicon acetate.

6. The process of claim 1, wherein the silylating agent is trimethylchlorosilane.

7. The process of claim 1, wherein the silylating agent is trimethylsilicon acetate.

8. A homogeneous cellulosic derivative having an average hydroxy substitution of 0.13 to 3.0 alkyl-silyl groups per glucose unit calculated on the $C_6$ glucose unit formulae for cellulose.

9. The derivative of claim 8, wherein the alkyl-silyl group is trimethylsilyl.

HARTWIG A. SCHUYTEN.
JEREMIAH W. WEAVER.
JOHN DAVID REID.

REFERENCES CITED

The following references are of record in the file of this patent:

UNITED STATES PATENTS

| Number | Name | Date |
|---|---|---|
| 2,306,222 | Patnode | Dec. 22, 1942 |
| 2,405,988 | Barry | Aug. 20, 1946 |
| 2,413,050 | Hyde | Dec. 24, 1946 |
| 2,476,107 | Moyer | July 12, 1949 |
| 2,520,963 | Reeves | Sept. 5, 1950 |

FOREIGN PATENTS

| Number | Country | Date |
|---|---|---|
| 575,675 | Great Britain | Feb. 28, 1946 |
| 575,696 | Great Britain | Feb. 28, 1946 |